L. G. FREEMAN.

HEEL SEAT JOINTING MACHINE.

APPLICATION FILED AUG. 28, 1912.

Reissued Sept. 15, 1914.

13,799.

5 SHEETS—SHEET 1.

Witnesses

O. Blanche Wargravis

Edith C. Hollbrook

Inventor

Louis G. Freeman

By Walter W. Howard

Attorney

L. G. FREEMAN.

HEEL SEAT JOINTING MACHINE.

APPLICATION FILED AUG. 28, 1912.

Reissued Sept. 15, 1914.

13,799.

6 SHEETS—SHEET 2.

Witnesses

O. Blanche Hargrave

Edith C. Holbrook

Inventor.

Louis G. Freeman

By Wilson W. Howard

Attorney

L. G. FREEMAN.

HEEL SEAT JOINTING MACHINE.

APPLICATION FILED AUG. 28, 1912.

Reissued Sept. 15, 1914.

13,799.

5 SHEETS—SHEET 3.

Witnesses
O. Blanche Hargraves
Edith C. Holbrook

Inventor
Louis G. Freeman
By Helen W. Howard
Attorney

L. G. FREEMAN.

HEEL SEAT JOINTING MACHINE.

APPLICATION FILED AUG. 28, 1912.

Reissued Sept. 15, 1914.

13,799.

6 SHEETS—SHEET 4.

Inventor

Witnesses

O. Blanche Hargraves

Edith C. Holbrook

Louis G. Freeman

By Nelson W. Norcid

Attorney

L. G. FREEMAN.

HEEL SEAT JOINTING MACHINE.

APPLICATION FILED AUG. 28, 1912.

Reissued Sept. 15, 1914.

13,799.

5 SHEETS—SHEET 5.

WITNESSES:
Elizabeth C. Coyle
Edith C. Hollbrook

INVENTOR.
Louis G. Freeman
By his Attorney
Nelson W. Howard

UNITED STATES PATENT OFFICE.

LOUIS G. FREEMAN, OF CINCINNATI, OHIO, ASSIGNOR TO UNITED SHOE MACHINERY COMPANY, OF PATERSON, NEW JERSEY, A CORPORATION OF NEW JERSEY.

HEAL-SEAT-JOINTING MACHINE.

13,799. Specification of Reissued Letters Patent. Reissued Sept. 15, 1914.

Original No. 1,019,145, dated March 5, 1912, Serial No. 443,261. Application for reissue filed August 28, 1912. Serial No. 717,612.

*To all whom it may concern:*

Be it known that I, LOUIS C. FREEMAN, a citizen of the United States, residing at Cincinnati, in the county of Hamilton and State of Ohio, have invented new and useful Improvements in Heel-Seat-Jointing Machines, of which the following is a specification.

In the manufacture of welt shoes, it is necessary to trim the rear ends of the welt adjacent the heel, in order to make a neat and practically concealed joint, this being accomplished usually by skiving or scarfing the ends of the welt, so as to make a lapped joint with the rand or heel layer, and then to push in and to tack down these scarfed ends of the welt. Accordingly my present invention aims to provide means for quickly and accurately accomplishing by a machine these results which have been heretofore accomplished by hand.

The constructional details and further objects and advantages of my invention will be pointed out more at length in the course of the following description, reference being had to the accompanying drawings, in which I have shown a preferred embodiment of the invention.

Figure 1:
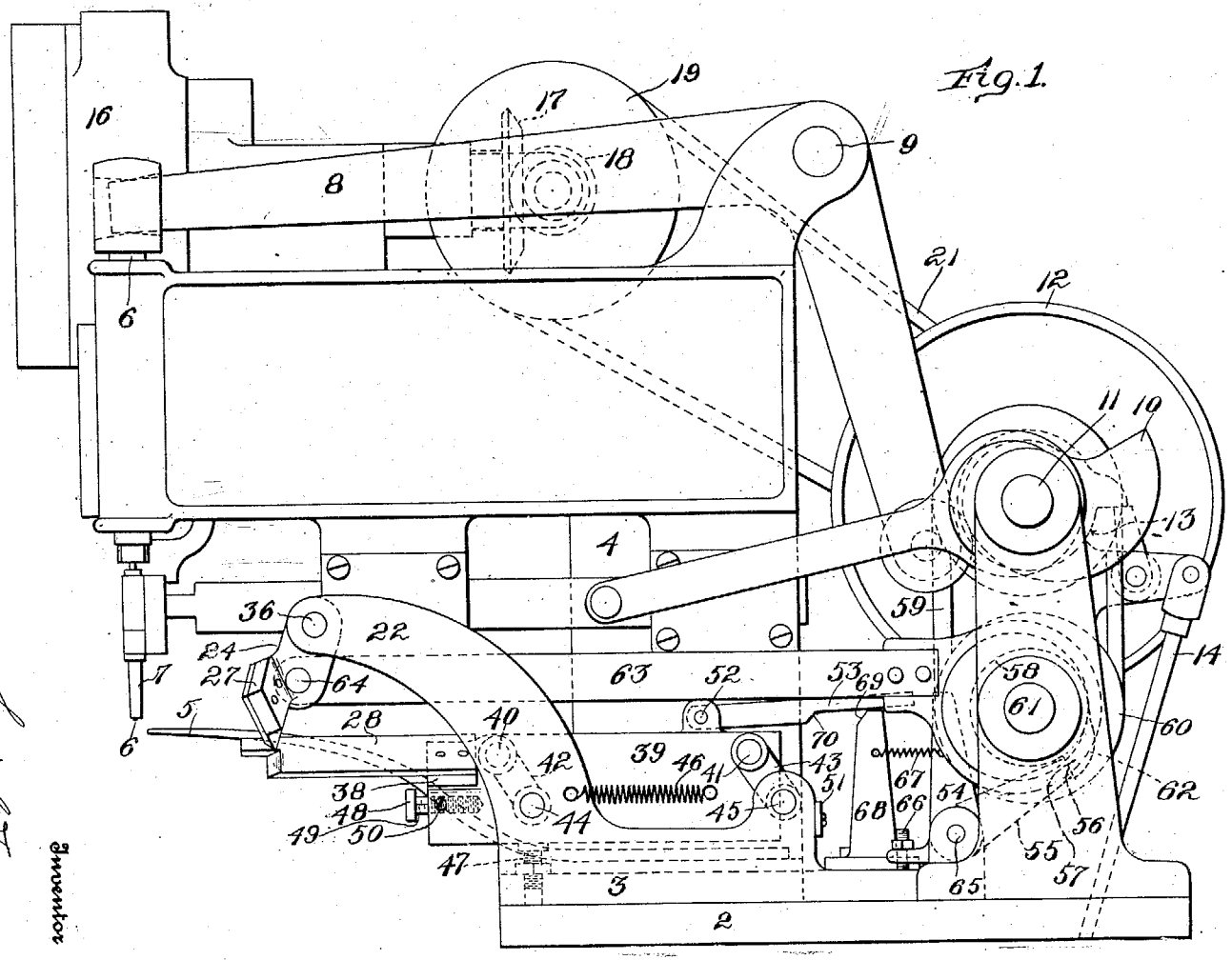
Figure 2:
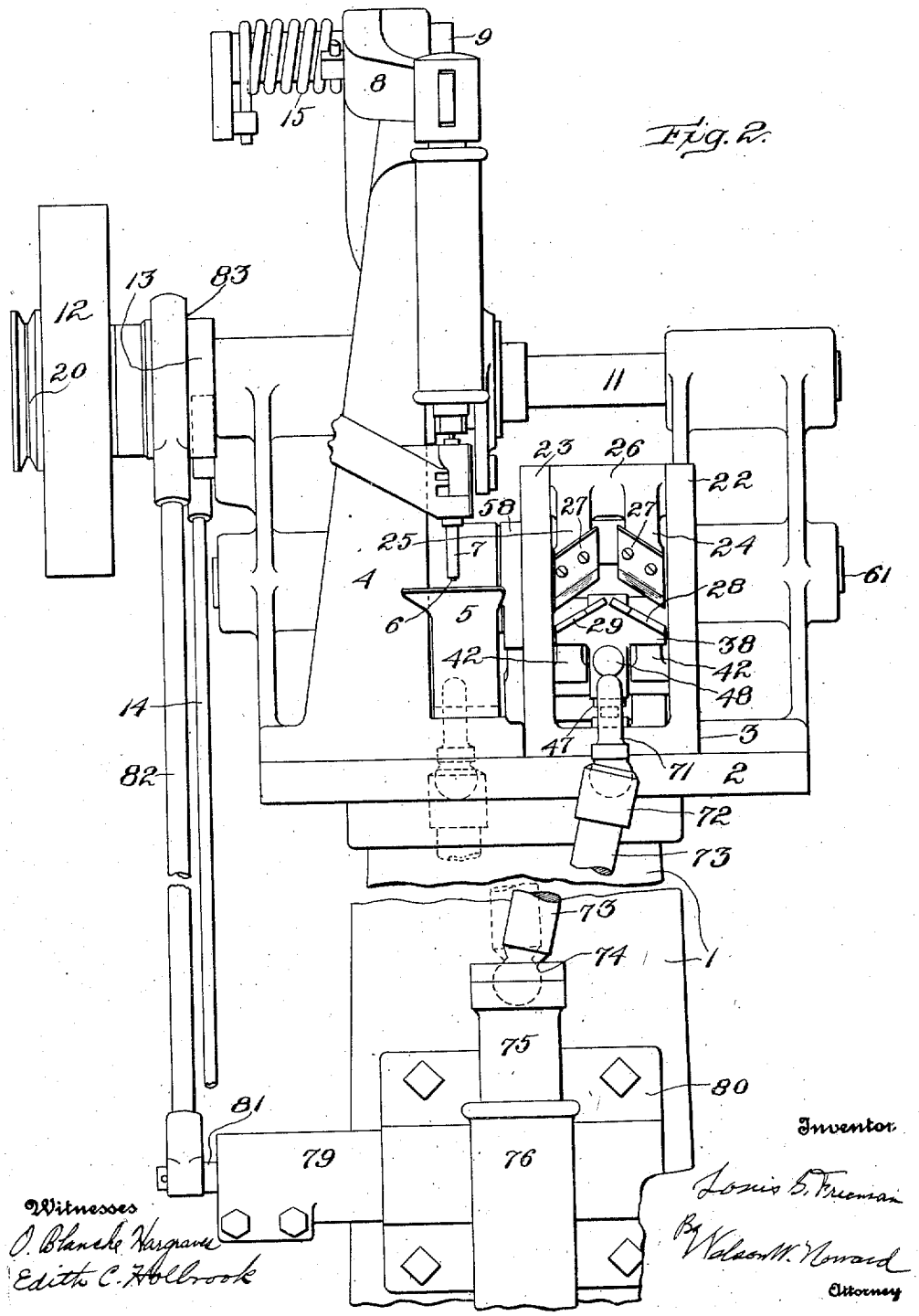
Figure 3:
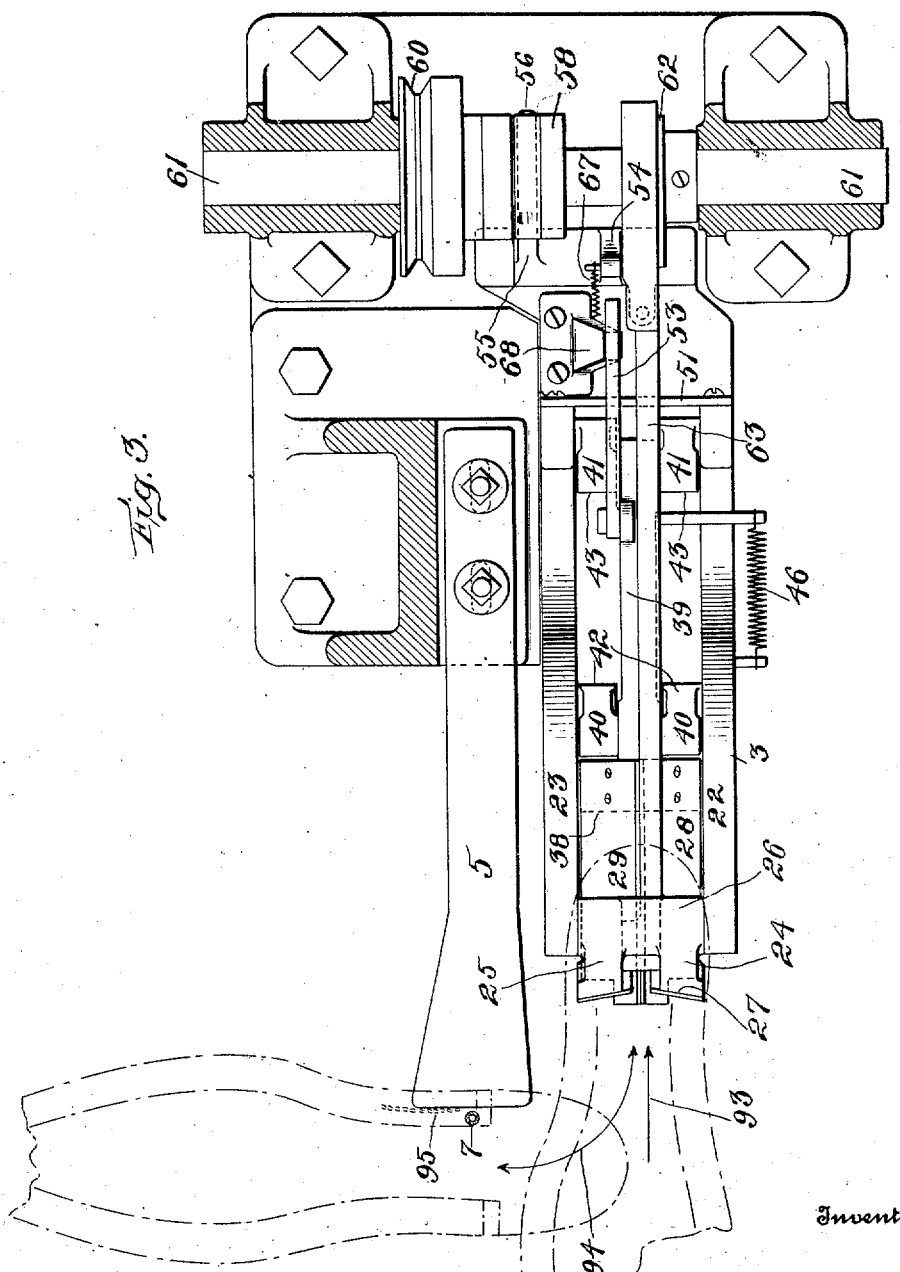
Figure 4:
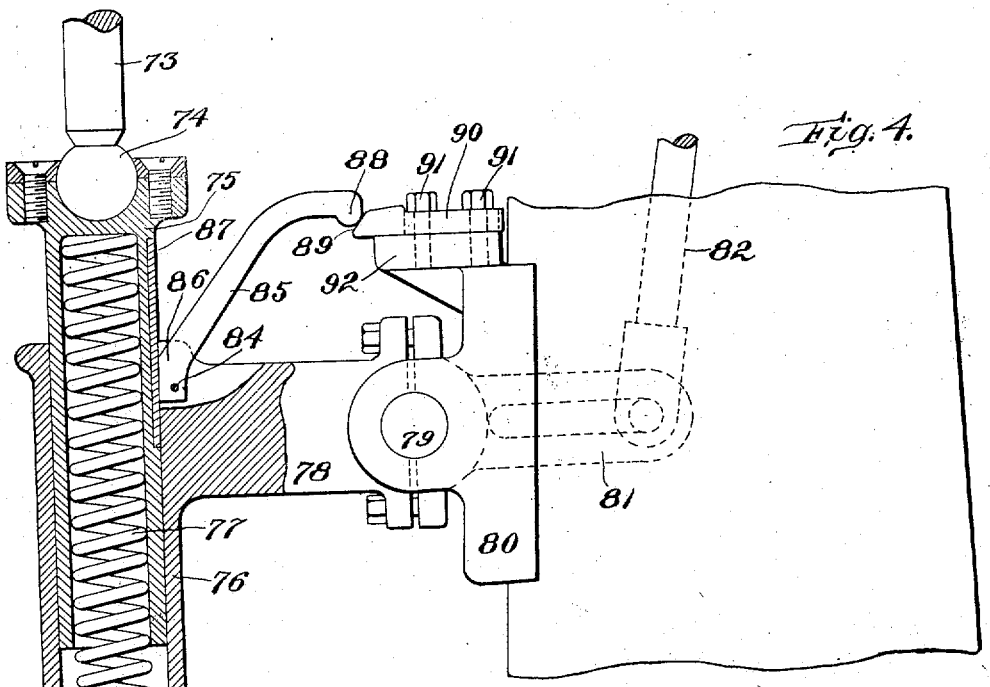
Figure 5:
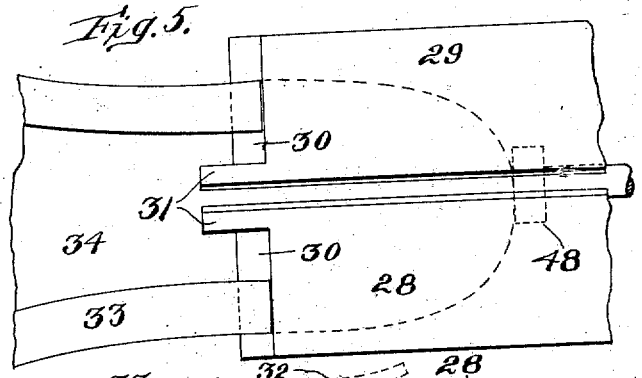
Figure 6:
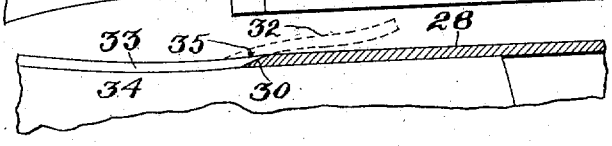
Figure 7:
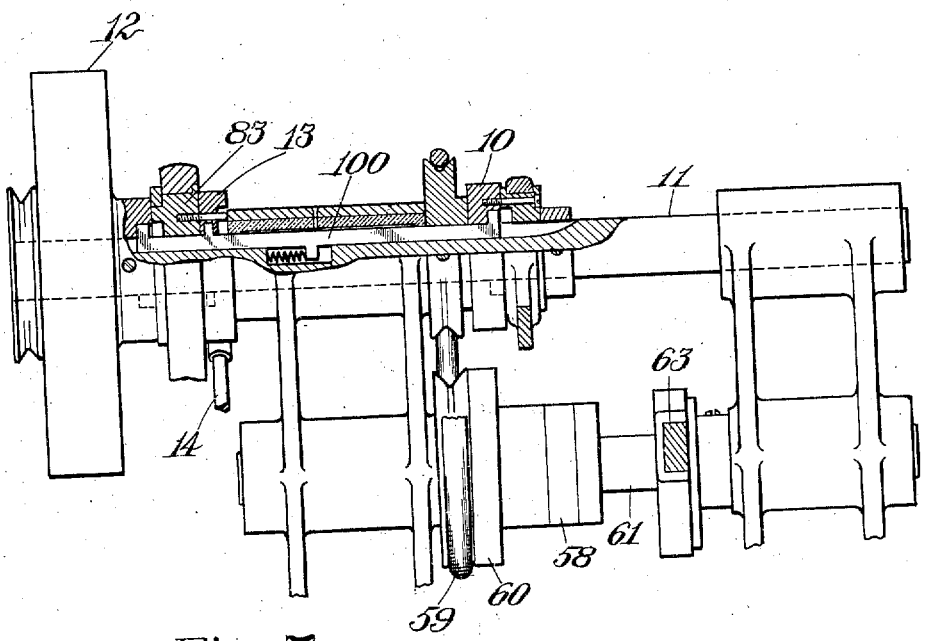
Figure 8:
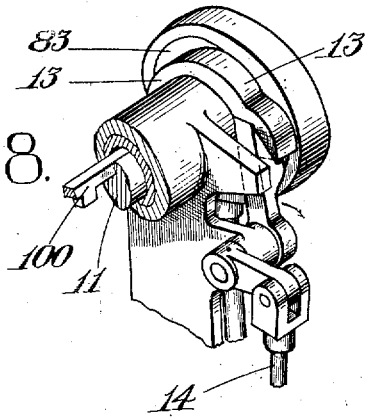

In the drawings, Figure 1 is a view in side elevation of the head of the machine; Fig. 2 is a view thereof in front elevation; Fig. 3 is a horizontal sectional view showing the scarfing mechanism in top plan; Fig. 4 is an enlarged vertical sectional view of the lower end of the jack; Figs. 5 and 6 show in top plan and side elevation a portion of a shoe in operative position being scarfed. Fig. 7 is a vertical section showing in detail the actuating means for the nail driving and jack operating mechanism, and Fig. 8 is a detail view of the clutch actuating mechanism.

The general features of my invention may have a wide variety of embodiments, and accordingly it will be understood that I do not intend to limit my invention to the preferred constructional details herein shown, but, except in my more specific claims, intend to include any kind of scarfing, nailing, and holding mechanisms provided they are arranged and actuated to coöperate in accordance with the broad features of my invention, which I will now set forth with reference to the specific embodiment herein chosen for the purpose of giving a clear explanation.

On a suitable pedestal 1 is a head 2 provided at one side, preferably the right, with a bracket 3 which carries the scarfing or cutting mechanism, and at the other side with an upright 4 carrying a tacker mechanism and spring pusher bar or positioner 5. The tacker may be of any kind, and accordingly I have not attempted herein to show the details thereof, it being sufficient to indicate the driver 6, nozzle 7, bell-crank driving lever 8 pivoted at 9 and actuated by a cam 10 from a shaft 11 driven by a pulley 12, the cam being connected with the shaft, as hereinafter explained, by a clutch 13 operated by a foot lever (not shown) and connecting rod 14. The driving blow is produced in usual manner by a spring 15 and the tacks are fed from a hopper 16 whose agitating mechanism is driven by gears 17 and 18, pulleys 19, 20 and belt 21.

Referring now to the scarfing mechanism, between two forwardly and upwardly extending uprights 22, 23 of the bracket 3 are pivoted two arms 24, 25 connected by a sleeve or yoke 26 and provided at their lower ends with knives 27 set obliquely, as best shown in Fig. 2, to coöperate with two members 28, 29 which constitute cutting blocks and means for controlling the length of the scarf and preventing the knives from cutting improperly. To this end each member 28, 29 is provided with a beveled or sloping front edge 30 and an adjacent projecting end 31. The beveled edges 30 are sufficiently long to accommodate all the sizes of shoes which it is intended that the machine shall operate upon, and the slope of said beveled edges determines the angle or length of bevel of the scarfing or skiving of the welt, as will be more evident viewing Figs. 5 and 6, where it will be seen that in operation the free end 32 of the welt 33 of a shoe 34 is permitted to ride up over the edge 30 to the position shown in Fig. 6, or in other words, the shoe is pushed toward the members 28, 29 in such position that the heel end comes under said members while the welt-ends pass over said members, which serve as welt rests or supports and deflect the welt-ends in the position shown in Fig. 6, so that when the knives swing down in their cutting operation they cut off the welt-ends along the line 35, Fig. 6. The pivot 36 which constitutes the center of swinging movement of said knives is directly over the forward ends of the supporting members 28, 29 so that the knives cut substantially in the plane of the top surface of said supporting members. In view of the angular relation of the knives to their center of movement, seen best in Fig. 2, and the consequent path of movement of the cutting edges with reference to the rests, it will be obvious that the bevel produced on the welt ends will be inclined somewhat transversely as well as longitudinally of the welt. As herein shown, the members 28, 29 normally occupy a lowered position, being carried by a cross bar or block 38 rigidly secured to the front end of a heavy bar 39 pivoted at 40, 41 to the upper ends of links 42, 43 which are pivoted at their lower ends at 44, 45 to the uprights 22, 23, being normally swung forward into their inclined position by a spring 46 and limited in their downward movement by a screw stop 47 which engages the bar 39. At its forward end the bar 39 carries a heel stop 48 which controls the position of the scarf, being provided with an accurate gage 49 for this purpose and adjustable out and in, being locked in adjustment by a set screw 50. Thus when the heel of the shoe is placed against the heel stop 48 and pushed rearwardly, the result is that the members 28, 29 are raised in operative position by the rearward swinging of the links 42, 43, the rearward movement being stopped by the engagement of the bar 39 with a cross plate 51.

Pivoted at 52 to the bar 39 and moving therewith is a finger or trigger 53 whose free end is in position to engage the upper arm 54 of a bell crank whose opposite arm 55 provides a detent 56 engaging a lug 57 of a clutch 58. The clutch may be of any well known type, and hence I have omitted showing the details thereof. Power is derived from any suitable source, as from the shaft 11 through a belt 59 engaging a belt pulley 60 loose on the shaft 61 which carries the clutch 58, the clutch, when actuated, serving to connect the pulley and shaft. The shaft 61 is also provided with a crank or eccentric 62 connected by a rod 63 to the scarfing knives, where it is pivoted at 64.

The bell crank 54, 55 is pivoted at 65, and its normal position is preferably regulated by a set screw 66, said bell crank being held normally toward the left, Fig. 1, by a spring 67 secured to the arm 54 at one end and to a post 68 at its other end. The post 68 has a beveled corner 69 to engage an incline 70 on the under surface of the finger 53, so that as the latter is moved backwardly by the engagement of the heel of a shoe with the heel stop 48 the trigger first trips the bell crank and then its incline 70 rides up on the bevel 69 so as to hold said trigger out of the path of the bell crank, thereby permitting the latter to spring back into its normal position the moment that the clutch has started. By this provision, the clutch and connected mechanism, including the scarfing knives, are positively stopped after each operation and cannot be started again until the shoe-engaging parts have been restored to their initial position.

Viewing Fig. 2 it will be seen that the scarfing knives and welt-supporting blocks or members are inclined relatively to each other or arched with their outer edges depending, the purpose of this inclination being to accommodate the knives to the position of the welt-ends with relation to the molded or curved shank of the shoe.

The shoe is yieldingly supported on a jack pin 71 mounted by means of a universal joint 72 in the upper end of the jack post 73, which in turn is supported at its lower end by a ball and socket joint 74, see Figs. 2 and 4, in the upper end of a sleeve 75 arranged to telescope in a surrounding cup-shaped sleeve or support 76, being yieldingly supported therein by a spring 77. The supporting sleeve 76 is formed integrally with an arm 78 fast on a shaft 79 pivoted in a block 80 mounted on the front of the column or pedestal 1 so as to bring the jack near to and approximately beneath the tacking mechanism. The shaft 79 is provided at its outer end, see Fig. 2, with a rearwardly extending crank 81, see also Fig. 4, connected by a rod 82 to an eccentric 83 driven by the shaft 11 whenever the clutch 13 is released by the operator. Pivoted at 84 to the jack support 78 is a locking dog or lever 85 whose lower end 86 when in the position shown in Fig. 4 permits the sleeve 75 to move freely up and down in the sleeve 76, but when turned on its pivot away from the position shown in Fig. 4 it instantly bites against the wear plate 87 and locks the two sleeves immovably together. To accomplish the automatic locking of the jack as thus explained, I provide the upper end of the lever 85 with a bearing surface 88 to engage the cam end 89 of a block 90 adjustably secured by bolts 91 to the upper end 92 of the block 80. The action of this cam arrangement is such that when the jack is raised by the rod 82 to bring the shoe into position beneath the tacker, the jack is positively locked against yielding movement just as it gets into nail-receiving position with the leather against the bottom of the nozzles 7, the rod 82 giving a very slightly farther upward movement to the jack, with the result that the latter is pinched against the last as the tack is driven, with almost exactly the same action and result as when a nail is driven by a hand hammer. The forcible pressing together of the jack and nozzle acts like a hammer to pound the leather as the tack is driven.

When the operator trips the treadle rod 14 and thereby releases the clutch member 13 the eccentric 83 and the cam 10 are connected to the shaft 11 by means of the sliding key 100 for simultaneous movement through one revolution of the shaft, as will be obvious on reference to the detailed showing of Figs. 7 and 8.

The operation of my machine is as follows: The operator first seizes the jack post 73 and swings it forward into jacking position, places the shoe on the spindle 71 and then swings it to the right and back with the heel toward the machine until the heel rests against the heel stop 48, and the beveled edges of the angularly arranged welt rests 28, 29 extend over the bottom of the heel-part of the shoe and between the seam and the ends of the welt in the position shown in Fig. 6. He then moves the shoe inwardly, Figs. 1 and 3, in the direction of the arrow 93, on Fig. 3, until the clutch trip 56 releases the clutch 58. At this moment the shoe and its welt-supporting rests 28, 29 have been swung on the links 42, 43 rearwardly and upwardly to the full line position, Fig. 1, so that the top surfaces of the members 28, 29 are in the proper plane to coöperate with the scarfing knives 27. During this manipulation of the shoe the shoe stock between the rests 28, 29 and the last bottom is compressed upon the last bottom before the tripping means is actuated to release the clutch. Immediately upon the releasing of the clutch 58, the knife actuator 63 is moved to the rear, thereby swinging the scarfing knives downwardly in an arc of movement approximately tangential to the top surfaces of the parts 31, and slicing or chopping off the welt-ends with a bevel or length of slope regulated by the angle or bevel of the surfaces 30. The projecting ends 31 act as guards to protect the shoe and prevent the plates from cutting any other parts excepting the welt-ends. Adjustment of the heel stop which engages the back seam of the heel determines the point where the welt shall be scarfed, and the scarfing takes place instantly when the shoe has been pressed back to proper position. All the operator has to do is to place the shoe under the overhanging welt rest member 28, 29, and against the heel stop 48, and then push the shoe back. This single movement releases the clutch, permitting the knives to operate, and also brings the welt rest up into proper coöperating position. By having the welt rest or support normally forward and down it is in the best position to enable the operator to observe how he is placing the shoe and to lift the welt-ends with his hand over the beveled ends 30 in case the latter do not readily slide in under said ends as the shoe is being shoved back into place. Simply pushing the shoe back into position as far as the welt rest will go automatically throws in the clutch which operates the cutting mechanism. As soon as the welt is trimmed or scarfed the knife returns to raised position clear of the rest and there stops. The shoe is then pulled forward toward the operator and swung around in the direction of the arrow 94, the adjacent front edge and corner of the pusher or positioner 5 being located just right to catch under the welt as soon as the shoe is swung toward it, and then as the shoe is moved forward so as to bring the adjacent scarfed end of the welt below the nozzle, the stationary pusher 5 engages the stitches 95 which join the welt to the shoe upper, and the operator, by pressing inwardly on the shoe, stretches the slack leather of the upper tightly over the last, at the same time, by reason of the upward inclination of the spring pusher bar 5, causing the shoe to move upwardly toward and into engagement with the tacker nozzle, and, as he does so, depresses the treadle rod 14. This serves to release the clutch 13 and connect the eccentric 83 and the cam 10 to the rotating shaft 11. The eccentric 83 operates at once to raise the jack, which is automatically locked by the engagement of the surfaces 88, 89, and then the further raising movement hammers or pinches and presses the welt down hard upon the upper, and at the same moment the nail is driven by the nailer or tacker. The operator has been enabled to retain his grasp or manipulative hold on the shoe without intermission, so that as a result of the combined hand manipulation and machine manipulation a perfectly smooth, tight shank portion of the upper is secured. After one side is nailed the jack-locking mechanism releases and the jack is lowered, and the operator immediately pulls the shoe toward him from under the nozzle, turns the shoe and presents the other side, pressing the upper and welt against the pusher blade to take up all slack leather at the joint the same as before, and again depressing the treadle and treadle rod, causes the jack to rise, become positively locked and then hammer or press the joint hard against the nozzle (which I make extra large for facilitating this operation) and the nail to be driven, thereby holding all that the hand manipulation and juxtaposition of mechanisms have accomplished. When a nail is driven and this portion of the machine comes to the stopping point, the jack is released from the nozzle so that the operator can pull the shoe toward him for inspection or can swing it on the comparatively long front edge of the presser 5 or otherwise manipulate the leather so as to bring the joint into exactly the desired position for receiving another tack if deemed necessary. The jack is operated in timed relation with the tacking mechanism and only when a nail is being driven, being free to yield at all other times and adjust itself according to the height of the last and shoe. The jack does not lock excepting on the last quarter of its upper stroke, being free approximately three quarters of the stroke, depending upon the adjustment of the cam block 90, but when cutting the welt joint the jack is perfectly free, and it is also perfectly free when placing the shoe on the jack spindle and when moving the latter under the nozzle to tack the joint. It is not locked until the operator depresses the treadle to drive the nail, which starts the jack lever 81 to swing the locking device upward, although, in practice, this does not usually move the jack, which has already been previously so located by hand as to bring the leather of the shoe against the nozzle. As soon as the jack lever has brought the locking mechanism into action, then the further movement of said lever starts the compression of the leather between the jack spindle and the nozzle, this pressure being exerted on the loose leather under the nozzle where the tack is to be driven. For handling the average sizes of adult shoe, the pusher or presser and the tacker are about four inches forward of the mechanism for trimming or scarfing the joint and about three inches to one side, this relation of the parts permitting the operator to maintain his grasp upon the leather about the waist of the shoe while moving the shoe in the directions of the arrows 93, 94, and this relation also causes the adjacent corner or edge of the pusher to engage between the welt and upper when the shoe is swung as indicated by the arrow 94.

It will be understood that my invention is not to be limited to the construction details herein set forth as the preferred embodiment thereof, as many variations in form, arrangement and combination of parts may be resorted to without departing from the spirit and scope of my invention as set forth in the following claims.

Having described my invention, what I claim as new and desire to secure by Letters Patent of the United States is:—

1. A jointing machine, consisting of scarfing mechanism and nail driving mechanism arranged to operate upon the shoe with the shoe in different respective positions, and a supporting jack for the shoe, said parts being juxtaposed so as to scarf the welt-ends and nail the scarfed ends without removing the shoe from the jack or releasing the manipulative hold on the shoe.

2. In a jointing machine, scarfing mechanism to scarf the ends of the welt, nail driving mechanism to nail the scarfed welt-ends, positioning means for engaging and maintaining the welt and upper in fixed relation to the nail driver, and a supporting jack, the nail driver and positioning means being located ahead of the scarfing mechanism and the jack mounted to move from one to the other, the distance of said nail driver and positioning means ahead of the scarfing mechanism being such as to cause the scarfed shoe properly to engage said positioning means immediately upon being swung with the jack forward away from scarfing position, whereby the operator is enabled to maintain his manipulative hold upon the loose leather about the joint until the jointing operation is completed.

3. In a jointing machine, a welt rest in the form of a blade adapted to enter between the welt and the botton of the shoe in supporting engagement beneath the welt and mounted for movement toward and from the plane of action of the scarfing mechanism, and scarfing mechanism coöperating with said rest in scarfing the welt-end thus supported on said rest.

4. In a jointing machine, a welt rest in the form of a blade adapted to enter between the welt and the bottom of the shoe in supporting engagement beneath the welt and for movement to carry the work from position of presentation into welt scarfing position, a pivoted scarfing knife mounted to swing approximately tangentially to the welt-supporting surface of said rest, and means for swinging said knife.

5. In a jointing machine, a welt rest in the form of a blade adapted to enter between the welt and the bottom of the shoe in supporting engagement beneath the welt and mounted for movement lengthwise of the shoe to carry the work into and out of the path of the scarfing mechanism, and scarfing mechanism coöperating with said rest in scarfing the welt-end thus supported on said rest, said rest having projecting portions extending over the bottom of the shoe in position to guard the latter against being accidentally cut by said scarfing mechanism.

6. In a jointing machine, movably mounted welt rests for receiving beneath them the heel end of a shoe and supporting above them the opposite ends of the welt, scarfing mechanism for scarfing the two welt-ends thus supported and means actuated by the movement of said rests to cause the operation of the scarfing mechanism.

7. In a jointing machine, opposite welt rests for receiving beneath them the heel end of a shoe and supporting above them the opposite ends of the welt, said rests being arched with their outer edges depending to conform approximately to the rounded bottom of the shoe, and scarfing mechanism for scarfing the two welt-ends thus supported obliquely.

8. In a jointing machine, a welt scarfing means, a welt supporting blade into operative relation to which the shoe is to be moved endwise and by the engagement of which with the end of the inseam the longitudinal position of the shoe relative to the scarfing means may be determined, additional means for positioning the shoe longitudinally in case the shoe is not stopped in the proper position by the engagement of the inseam with the welt supporting blade, power driven actuating mechanism, and connections where through said mechanism may be started by pressure of the shoe applied through either said blade or said additional positioning means.

9. In a jointing machine, scarfing mechanism, means for supporting the welt-ends in position to be scarfed thereby, actuating means for said scarfing mechanism, and tripping means for setting the latter in operation actuated by the moving of the shoe into operative position.

10. In a jointing machine, scarfing mechanism, means which is mounted for upward movement by pressure exerted through the shoe tending to press the shoe stock down into position for the shoe to be treated and which is arranged to extend under and support the welt ends in position to be scarfed, actuating means for said scarfing mechanism, and tripping means arranged to be actuated by movement of said welt end supporting means by the shoe after pressure has been applied to compress the shoe stock between said supporting means and the last bottom.

11. In a jointing machine, scarfing mechanism, actuating mechanism therefor, including a clutch, a heel top arranged to have a predetermined movement to permit the shoe to reach correct operative relation to the scarfing mechanism, and tripping mechanism actuated by the movement of said heel stop for tripping said clutch when the shoe reaches a predetermined operative relation to the scarfing mechanism.

12. In a jointing machine, scarfing mechanism, actuating mechanism therefor, including a clutch, a movable heel stop, tripping mechanism actuated by the movement of said heel stop when engaged by a shoe for tripping said clutch, and means for automatically restoring said tripping mechanism into position to limit the scarfing mechanism to one operation for one movement of the heel stop.

13. In a jointing machine, skiving mechanism, a movable heel stop, operating means for said skiving mechanism, including a clutch, a detent normally restraining the clutch, a trigger movable with said heel stop for releasing said detent, automatic means to restore said detent to clutch-restraining position, and means for automatically moving said trigger out of the path of said detent as soon as the latter has been tripped.

14. In a jointing machine, a scarfing knife, and a welt rest for supporting the welt-end in position to be scarfed, said welt-rest being movably supported and normally occupying a forward and downward position with relation to its operative supporting position.

15. In a jointing machine, a scarfing knife, a welt rest for supporting the welt-end in position to be scarfed, said welt rest being movably supported and normally occupying a forward and downward position with relation to its operative supporting position, and means in position to be engaged by the shoe for moving said welt rest into operative position by the movement of the shoe.

16. In a jointing machine, scarfing mechanism, and nail driving mechanism, combined with a jack support for the shoe provided with spring raising means for giving the jack an upward tendency at all times with relation to the scarfing mechanism, and locking mechanism for said jack actuated in timed relation to the nail driving movements of the nail driver for locking said jack against the action of its spring when a nail is to be driven.

17. In an apparatus for use in removing surplus material at and adjacent to the two end portions of the welt of a lasted and welted shoe, welt end rests inclined transversely in opposite directions downwardly and outwardly and between which and the shoe there is provision for relative movement lengthwise of the shoe to bring the rests into welt supporting relation to the welt ends, combined with welt end scarfing knives mounted for movement lengthwise of the shoe in a similarly inclined relation to the plane of the shoe bottom.

18. In an apparatus for use in removing surplus material at and adjacent to the two end portions of the welt of a lasted and welted shoe, welt end rests formed to support the two ends of the welt at the same time in positions to be cut, said rests being arranged to project forwardly over the shoe bottom toward the welt ends, and being shaped to receive an arched shank between the welt ends.

19. A welt butting machine having, in combination, a welt butting knife, and shoe positioning means arranged to engage the shoe bottom before the shoe reaches welt butting position and to guide and control the movement of the shoe into operative relation to the knife.

20. A welt butting machine having, in combination with a welt butting knife, shoe positioning means arranged to engage the shoe between the welt and the innersole and to be moved with the shoe for guiding the shoe into predetermined relation to the path of the knife.

21. A machine of the class described having, in combination, means for removing surplus material from a shoe bottom, and a guard mounted on the machine for movement in a predetermined path and arranged to receive the shoe in a position remote from said means and to be moved with the shoe to guide and direct movement of the shoe into operative relation thereto.

22. A machine of the class described having, in combination, means for operating on a shoe bottom, a shield for the shoe bottom mounted on the machine for movement in a predetermined path and arranged to receive the shoe in a position remote from said means and to be moved in a predetermined path with the shoe into operative relation to said means.

23. A machine of the class described having, in combination, a welt butting knife, a welt end rest movable from and toward the path of the knife and arranged to receive the welt end while in a position remote from the knife and to move with the work into the path of the knife and to support the welt end during the welt butting operation effected by the knife.

24. A machine of the class described having, in combination, a welt butting knife, and a welt end rest movable from and toward the path of the knife and comprising a thin edged plate formed and arranged to be introduced between the shoe bottom and an end portion of the welt which is to be severed while said rest is away from the knife and to move with the shoe to carry the welt into the path of the knife and to protect the shoe bottom from injury by the knife during the welt butting operation.

25. A machine of the class described having, in combination, means for operating on a welted shoe, a welt supporting abutment 5 that is constructed and arranged to engage the shoe in the crease between the upper and the welt and to be automatically moved upwardly together with the shoe when the shoe is pressed against the edge of the abutment, a shoe support, and power driven means for raising the support in time relation to the operation of said first mentioned means.

26. A heel-seat jointer, comprising stationary positioning means to engage the shoe between the welt and upper in position to press against the adjacent line of stitches and stretch the upper over the last, means for driving a tack to retain the upper while held thus stretched, and means for lifting the shoe against said engaging means and thereby compressing the upper between the engaging means and the last adjacent to the tack receiving point.

27. A heel-seat jointer, comprising a projecting arm secured to the machine, having a thin wide end shaped and arranged to engage the upper beneath the welt, tacking mechanism including a nozzle, said engaging end of the arm being located immediately below and approximately in line with the tack delivering end of said nozzle, and means operating in time relation with the tacking mechanism for raising the shoe and the shoe engaging end of the arm until the shoe is clamped against the nozzle.

28. A heel-seat jointer, comprising a projecting arm secured to the machine, tacking mechanism, the engaging end of said arm and the delivery point of said tacking mechanism approximately coinciding and being relatively adjustable, said engaging end of the arm being in position to permit a lasted shoe upper and welt to be pushed thereover for stretching a loose portion of the upper tightly over a last in position to receive a tack from said tacking mechanism while so held stretched, and power driven means for forcing the shoe in a direction to cause said engaging end of the arm to press the upper against the last during the tacking operation.

29. A heel-seat jointer, comprising a positioning member having an engaging end to enter beneath the welt to press the upper forward over the last, said end being unyielding to forward pressure of the shoe and yielding to vertical pressure of the shoe, tack-delivering means located approximately in vertical alinement with the extremity of the engaging end of said member, a shoe support movable toward or from the engaging end of said member, and power driven means for imparting vertical movement to said support while the shoe is in engagement with said member.

30. In a machine for working over a last the portions of shoe stock adjacent to the ends of the inseam, means for engaging the shoe in the welt crease, means for engaging the shoe bottom, said two means being constructed and arranged for successive engagement with the shoe, a driver for inserting a tack to secure the parts while they are held by the engaging means, and power driven mechanism for moving the shoe toward the driver prior to the tacking operation.

31. In a machine for working over a last the portions of shoe stock adjacent to the ends of the inseam, the combination with a suitable shoe support, of means for engaging the shoe in the welt crease to tighten the upper over the last, said means being constructed and arranged for automatic movement upwardly under endwise pressure against it, additional means positioned to operate upon the shoe at the end of said upward movement of the engaging means, and means for locking the shoe support to hold the shoe in position to receive the operation of said additional means.

32. In a machine for working an upper over a last, a lasting device for engaging the shoe stock in the welt crease combined with tack-driving means, said lasting device being constructed and arranged to move the shoe automatically toward the tack-driving means when pressure is applied in the direction for forcing the upper over the last, and additional means for maintaining the shoe in position for the tacking operation.

33. In a machine of the class described, tack-driving means, combined with a lasting device located below the tack-driving means and comprising a spring arm adapted to engage a welted shoe in the welt crease and constructed and arranged to lift the shoe toward the tacking means by the pressure applied in forcing the upper into lasted position, and means for maintaining the shoe in said uplifted position to receive the operation of the tacking means.

34. A machine of the class described having, in combination, means for working into lasted position the upper of a welted shoe adjacent to the end of the inseam and the end of the row of heel seat tacks, said means being constructed and arranged to engage the shoe stock between the upper and the welt and tighten the upper about the last, means for securing the upper while it is held in tightened condition, a movable shoe support, and means for moving said support and the engaging means into the field of operation of the securing means.

35. A machine of the class described having, in combination, a tacker, means for working into lasted position the upper of a welted shoe adjacent to the end of the inseam and the end of the row of heel seat tacks, said means being constructed and arranged to engage the shoe stock between the upper and the welt and force the upper inwardly over the edge of the last and upwardly toward the tacker and to hold the upper under tension while it is fastened by the tacker, a shoe support, and additional means for maintaining said support and the shoe in position for the tacking operation.

36. A machine of the class described having, in combination, means constructed and arranged to engage a welted shoe in the inseam at the rear end thereof and tighten the shoe stock at the rear end of the inseam inwardly over the last bottom relatively to the upper and welt in the shank and fore part of the shoe, a tacker arranged relatively to said tightening means to fasten the shoe stock while it is held under tension, a shoe support, and means for moving said support toward, the tacker in time relation to the operation of the tacker.

37. A machine for gathering in and holding the upper materials of a lasted welt shoe at the inner ends of the heel seat and for securing said materials, consisting of a tacking device, a frame, a resilient arm mounted on the frame, the free end of said arm being in position to permit a lasted shoe upper and welt to be pushed thereover for stretching the upper over a last in position to receive a tack from said tacking mechanism while so held stretched, and additional means for maintaining the shoe and said arm in position for the tacking operation.

38. In a machine for working into lasted position the upper of a welted shoe adjacent to the ends of the inseam and the row of heel seat tacks, means constructed and arranged to engage the shoe in the welt crease and force the welt and upper inwardly over the shoe bottom, combined with tack driving means arranged relatively to said engaging means to drive a tack into the stock while it is held by the engaging means, and a last support constructed and arranged for turning movement to present opposite sides of the shoe successively to said engaging and tack driving means.

39. In a machine for working into lasted position the upper of a welted shoe adjacent to the ends of the inseam and the row of heel seat tacks, means constructed and arranged to engage the inseam and force it inwardly from the edge of the last, combined with a tacker, said tacker and engaging means being relatively movable to permit the shoe stock to be tacked while it is held by the engaging means, and power driven means for effecting said relative movement to bring the shoe and the tacker into operative relation.

40. A machine for working upon a welted shoe, comprising means constructed and arranged for taking slack from the upper of a lasted and welted shoe between a rear end of the inseam and the adjacent end of the row of heel seat tacks, means for securing the upper in its tightened position, a shoe support movable to present the shoe to said first named means, and means for moving said support toward said securing means.

41. A machine for working upon a lasted and welted shoe, comprising means including a blade with a short acting edge to apply local pressure to the shoe between a rear end of the inseam and the adjacent end of the row of heel seat tacks for taking slack from the upper, said means being constructed and arranged to hold the upper in its tightened position to permit it to be secured, a shoe support, and power driven means for moving said support in a direction to cause the blade to press the shoe upper upon the last.

42. In a machine for working upon a welted shoe, devices constructed and arranged to engage the shoe stock to tighten the upper about the last and position the butt end of the welt over the shoe bottom, combined with means arranged to drive a tack for securing the upper and welt, a shoe support, and means for moving said support toward the tacker and for operating the tacker in time relation to the movement of said support.

43. In a machine for working over a last the portions of shoe stock adjacent to the ends of the inseam, means for engaging the shoe in the welt crease, means for engaging the shoe bottom, said two means being constructed and arranged to permit the use of the first means to force the upper and welt upwardly and their coöperation to force the upper and welt inwardly over the edge of the last, and shoe supporting means constructed and arranged for movement to present the shoe to said first named means and then to both of said means.

44. In a machine for working over a last the portions of shoe stock adjacent to the ends of the inseam, means for engaging the shoe in the welt crease to tighten the upper over the last, said machine being constructed and arranged to permit relative turning movement of the engaging means and the shoe to cause the engaging means to wipe the upper over the last bottom at the rear of the seam, means for supporting the shoe in position to receive said wiping operation, and means arranged with reference to said support for securing the upper in overworked position.

45. In a machine of the class described, means shaped to extend into the crease between the welt and upper for forcing the shoe stock over the last, said means being arranged for upward movement with the shoe, combined with an abutment for the shoe, power driven means for moving the shoe upwardly into engagement with said abutment, and means for driving a tack to secure the shoe stock.

46. In a machine of the class described, a member constructed and arranged to engage a shoe in the crease between the upper and welt for forcing the shoe stock over the last bottom, an abutment arranged for engagement with the shoe to force the shoe stock down upon the last bottom and hold it in position to be fastened, and power driven means for forcing the shoe against said abutment.

47. In a machine of the class described, a member constructed and arranged to engage a shoe in the crease between the upper and welt for forcing the shoe stock over the last bottom, an abutment arranged for engagement with the shoe to force the shoe stock down upon the last bottom, power driven means for forcing the shoe against said abutment, and means for driving a tack at a point adjacent to the abutment to secure the shoe stock.

48. A machine of the class herein described having, in combination, means for supporting a lasted and welted shoe, means arranged to engage in the crease beween the upper and the welt adjacent to its end to tighten the upper, and means to fasten the upper, said shoe support having provision for presenting the shoe with one welt end in position to be fastened and for movement of the shoe thereafter to present the other welt end in position to be fastened by the same fastening means.

49. A machine of the class described having, in combination, means for operating on a welted shoe, a blade arranged to extend into the welt crease and to be moved by pressure of the shoe from a shoe receiving position to a position for said means to operate on the shoe bottom, and power driven means for moving the shoe in a direction to effect said pressure upon the blade.

50. A machine of the class herein described having, in combination, means for positioning a butt end of the welt of a lasted and welted shoe, means for beveling the welt, means for tacking down the welt, said means being arranged to operate on a shoe in different positions of the shoe, and a support which is movable to present the shoe to one and then to another of said means.

51. A machine of the class herein described having, in combination, a knife arranged to cut the welt, a rest to support the welt against the cutting action of the knife, a tacker to fasten the end of the welt, and a shoe support movable to shift the shoe from operative relation to the knife into operative relation to the tacker.

52. A machine of the class herein described having, in combination, means for supporting the two butt ends of the welt of a lasted and welted shoe, means for beveling said two ends simultaneously, welt butt tacking means arranged to tack the two ends of the welt successively, and a support for the shoe arranged to permit movement for presenting one welt butt and then the other to said tacking means.

53. A machine of the class herein described having, in combination, means for butting a welt, means for pressing the welt end inwardly, and means for inserting a tack adjacent to the welt end while the pressure is maintained, said butting means and said tacking means being arranged adjacent to each other to permit the shoe to be conveniently moved for presentation to the butting means and then to the tacking means.

54. A machine of the class herein described having, in combination, a shoe support, welt butting means, means to position the welt end transversely of the shoe bottom, and welt end fastening means, said support having provision for movement of the shoe to present it to the butting means and then for further movement of the shoe angularly to present first one welt butt and then the other welt butt to the fastening means.

55. A machine of the class herein described having, in combination, means for butting the opposite ends of a welt simultaneously, means for engaging the welt crease laterally to press the welt end inwardly, and means to fasten the shoe stock on one side of the shoe while the welt is so pressed inwardly and then to fasten the stock on the other side of the shoe after the shoe has been turned through 180° and the welt end on said other side has been pressed inwardly by the said crease engaging means.

56. A machine of the class herein described having, in combination, a welt rest to underlie the welt ends for the butting operation, a welt butter, a separate welt positioner to press the welt inwardly over the shoe bottom into position to be fastened, and a welt tacker.

57. A machine of the class herein described having, in combination, rests for the two ends of the welt of a welted shoe, cooperating cutters, and a single welt end tacker to which the two sides of the shoe are presented successively.

58. A machine of the class herein described having, in combination, rests for the two ends of the welt of a welted shoe, cooperating cutters for the two welt ends, a single transversely acting positioning means for the welt and a single tack driving means to which the two sides of the shoe are presented successively for positioning and fastening the two welt ends.

59. A machine of the class herein described having, in combination, means for butting a welt, means for tightening the upper over the last bottom adjacent to the end of the welt, means for tacking the upper, and a shoe support by which the shoe can be moved to present one welt end and then the other to the same tacking means.

60. A machine of the class herein described having, in combination, means for butting a welt, means for tightening the upper over the last bottom in the region of the welt end, and a tacker adapted to fasten the upper and the welt end, said machine being constructed and arranged to permit movement of the shoe from operative relation to the butting means into position for the welt butt on one side to be tacked and then for the welt butt on the other side of the shoe to be tacked.

61. A machine of the class herein described having, in combination, a welt butter, and a work rest constructed and arranged to extend under the welt end and mounted for movement to cause the welt butter to do its work.

62. A machine of the class herein described having, in combination, a welt butter, actuating mechanism therefor, a movable welt rest, and means arranged to be operated by the movement of the rest to start the actuating mechanism.

63. A machine of the class herein described having, in combination, a welt butter, actuating mechanism therefor, a welt rest formed to support the welt end at an angle to the path of the butter to cause the welt to be butted on a bevel and movable to carry the welt toward the path of the butter.

64. A machine of the class herein described having, in combination, a welt butter, actuating mechanism therefor, a guard for the shoe, and means for directing and controlling movement of the guard to guide the shoe from position of presentation thereto to welt butting position.

65. A machine of the class herein described having, in combination, a welt butter, suitable actuating mechanism therefor, and a welt rest arranged to extend under the welt butt between the welt and the shoe bottom and position the welt at an inclination to the path of the butter and adapted for movement with the shoe from a position of presentation into welt butting position.

66. A machine of the class herein described having, in combination, a welt butter, and a welt rest mounted for movement backwardly and upwardly from shoe receiving position to position for the shoe to be operated upon by the butter.

67. A machine of the class herein described having, in combination, welt butters, and welt end rests normally occupying a shoe receiving position below and in front of their operative position and mounted upon parallel links for movement upwardly and backwardly by the shoe into the path of the welt butters.

68. A machine of the class herein described having, in combination, a welt butter, a rest to support the welt for the action of the butter, said rest normally occupying a position below the butter to facilitate the positioning of the welt thereover, and means arranged to be caused to start the butter into operation in response to a movement of the rest.

69. A machine of the class herein described having, in combination, a welt butter and a welt butt tacker arranged to operate on the shoe in different positions of the shoe, and a shoe support arranged to present the shoe for the butting and the tacking operations successively.

70. A machine of the class herein described having, in combination, a welt butter, a welt butt tacker, and a shoe support constructed and arranged to sustain the shoe yieldingly for the butting operation and unyieldingly for the tacking operation.

71. A machine of the class herein described having, in combination, a welt butter and a welt butt tacker arranged to operate on a shoe in different positions of the shoe, a shoe support constructed and arranged to present the shoe for the butting and the tacking operations, and operating mechanism for lifting the support to compress the stock against the tacker prior to the insertion of the tack.

72. A machine of the class herein described having, in combination, a welt butter and a welt butt tacker arranged to operate respectively on a shoe in different positions of the latter, and a shoe support arranged to uphold the shoe in operative relation to the butter and to the tacker.

73. A machine of the class herein described having, in combination, a welt butter and a welt butt tacker arranged to operate respectively on a shoe in different positions of the latter, and a shoe support arranged to uphold the shoe in operative relation to the butter and to the tacker, said machine having provision for giving automatically different qualities to the upholding of the shoe to the butter and to the tacker.

74. A machine of the class herein described having, in combination, a welt butter and a welt butt tacker arranged to operate respectively on a shoe in different positions of the latter, a shoe support arranged to uphold the shoe in operative relation to the butter and to the tacker, and operating means connected with the butter and with the tacker and adapted to be connected with the support for lifting it toward the tacker.

75. A welt butting machine having, in combination, means for removing surplus material at and adjacent to the two end portions of the welt, and welt end rests inclined transversely in opposite directions downwardly and outwardly.

76. A welt butting machine having, in combination, means for removing surplus material at and adjacent to the two end portions of the welt, and welt end rests and guards extending in advance thereof to protect the shoe bottom from injury by said means.

77. A welt butting machine having, in combination, means for removing surplus material at and adjacent to an end portion of the welt, a welt rest, and a guard movable with the shoe into operative relation to said means and arranged to protect the shoe from injury by said means.

78. A welt butting machine having, in combination, means for removing surplus material at and adjacent to the two end portions of the welt, guards covering the middle portion of the shoe bottom, and welt end rests extending from the guards laterally on each side and having a width to support, for the action of said means, the welt ends of shoes varying widely in breadth.

79. In a welt butting apparatus, resting and positioning devices for the two butt end portions of the welt of a shoe, and a shoe guide and guard arranged relatively thereto to engage the shoe bottom inside the inseam and under which the shoe can slide into operative relation to said devices.

80. A welt butting machine having, in combination with a welt butting knife, shoe positioning means arranged to engage the shoe bottom before the shoe reaches welt butting position and to guide the shoe in its movement toward the path of the knife, and adjustable means for predetermining the extent of that movement.

81. A welt butting machine having, in combination, means for removing surplus material at and adjacent to the two end portions of the welt, and welt rests mounted for movement by the shoe from shoe receiving position to operative relation to said means.

82. A welt butting machine having, in combination, means for removing surplus material at and adjacent to an end of a welt, and a welt end rest mounted for movement with the shoe from shoe receiving position to operative relation to said means.

83. A welt butting machine having, in combination, means for removing surplus material at and adjacent to the two end portions of the welt, and welt rests mounted for movement upwardly and backwardly from shoe receiving position to operative position.

84. A welt butting machine having, in combination, means for removing surplus material at and adjacent to an end of a welt, and a welt rest mounted for movement perpendicularly to the plane of the shoe bottom and also in a direction lengthwise of the shoe from shoe receiving position to position for the welt to be butted.

85. A welt butting machine having, in combination, means for removing surplus material at and adjacent to an end portion of the welt, and a welt rest arranged to be moved by pressure of the shoe from a shoe receiving position to a position for said means to operate on the welt.

86. A welt butting machine having, in combination, means for removing surplus material at and adjacent to an end portion of the welt, and a welt rest mounted for movement upwardly and backwardly from shoe receiving position while maintaining constant angular relation to said means.

87. A welt butting machine having, in combination, means for removing surplus material at and adjacent to the end of the welt, a movable welt rest, and mechanism arranged to be set into operation by the movement of the rest for causing said means to do its work.

88. A welt butting machine having, in combination, means for removing surplus material at and adjacent to the ends of the welt, welt rests arranged for movement by the shoe, and a clutch arranged to be closed by the movement of said rests to cause said means to operate.

89. A welt butting machine having, in combination, a welt butter, a welt rest movable from a shoe receiving position to operative relation to the butter, and driving mechanism for the butter arranged to be started automatically during said movement.

90. A welt butting machine having, in combination, welt butting means, welt resting means movable from a shoe receiving position to an operative relation to the butting means, and means actuated automatically by said movement to cause the butting means to do its work.

91. A welt butting machine having, in combination, a support, a carrier pivoted on said support substantially over the welt butting point on the shoe, a blade mounted in said carrier at an inclination to its length, and means to actuate the carrier to cause the blade to sever the welt by movement in an arc substantially tangential to the plane of the lower face of the body of the welt.

92. A welt butting machine having, in combination, a support, a carrier pivoted on said support substantially over the welt butting point on the shoe, a blade mounted in said carrier at an inclination to its length, a welt rest formed and arranged to determine the plane in which the welt end will be supported for cutting, and means to actuate the carrier and its blade in an arc substantially tangential to the plane of the body of the welt.

93. A welt butting machine having, in combination, means to position a shoe, and means for removing surplus material at the end of the welt, said two means being constructed and arranged to produce on the welt a bevel inclined lengthwise and transversely of the welt.

94. A welt butting machine having welt butting blades for the two ends of the welt arranged to cut lengthwise of the welt and having their cutting edges at acute angles to the median vertical plane of the machine.

95. A welt butting machine having welt butting blades for the two ends of the welt arranged to cut lengthwise of the welt and having their cutting edges inclined downwardly and outwardly from the middle.

96. A welt butting machine having a welt butting knife and a carrier on which the knife is mounted in a position oblique with relation to both the vertical transverse plane and a longitudinal plane of the machine, combined with means for actuating the knife.

97. A welt butting machine having two welt butting knives for beveling simultaneously opposite ends of the welt of a shoe, and a carrier on which the knives are mounted in a position oppositely inclined to the vertical longitudinal plane of the machine.

98. In a welt butting apparatus resting and positioning devices arranged to be inserted under the two butt end portions of the welt of a shoe by a relative movement of the shoe and said devices lengthwise of the shoe, said devices having welt supporting surfaces oppositely inclined to the vertical longitudinal plane of the apparatus.

99. In a welt butting apparatus resting and positioning devices arranged to be inserted under the two butt end portions of the welt of a shoe by a relative movement of the shoe and said devices lengthwise of the shoe, said devices having their lower faces which lie adjacent to the shoe oppositely inclined downwardly and outwardly with relation to the vertical longitudinal plane of the apparatus.

100. A welt butting machine having, in combination, cutting means, driving mechanism, a stop adapted to be actuated by contact with the shoe to start the driving mechanism, and means for effecting adjustment to vary the relation of the cutting means and the shoe at the time when the driving mechanism shall be started.

101. A welt butting machine having, in combination, welt butters, driving mechanism therefor, a stop to be displaced by the shoe to start the driving mechanism, and means whereby adjustment of the welt butters and the stop can be effected to vary the point of operation of the butters on the shoe.

102. A welt butting machine having, in combination, means for operating on the shoe, driving mechanism therefor, a contact member to be engaged by the shoe for starting the driving mechanism when the shoe is in position to be operated upon, and means for adjusting the contact member and the said means for operating on the shoe to change the point on the shoe at which said operating means will act.

103. A welt butting machine having, in combination, a welt butter, a welt butt tacker, and means constructed and arranged to give yielding support to the shoe for the operation of one of said devices and unyielding support to the shoe for the operation of the other device.

104. A welt butting machine having, in combination, a welt butter, a welt butt tacker, actuating mechanism for said devices, a shoe support, and means operatively connected with said actuating mechanism for locking the support when one of said devices is operative, said locking means being inoperative when the other device is acting.

105. A welt butting machine having, in combination, a welt butter, a welt butt tacker, a yieldingly sustained shoe support adapted to present the shoe to each of said devices, and driving mechanism for lifting the support automatically when one of said devices is operating and arranged to leave the support at rest when the other device is operative.

106. A machine of the class described, comprising means constructed and arranged to engage a shoe in the welt crease to tighten the upper over the last, a tacker, a shoe support, and means for relatively actuating the shoe support and said other means to compress the shoe stock upon the last bottom between the upper tightening and the tacking operations.

107. A machine of the class described, comprising means to engage the shoe between the welt and upper in position to press against the adjacent line of stitches and stretch the upper over the last, means for driving a tack to retain the upper while thus held, and means to uplift the shoe against the tack driving means immediately prior to the insertion of the tack.

108. A machine of the class described having, in combination with means for operating on a welted shoe, a plate having an edge formation to engage the shoe between the welt and the upper, and parallel link supports for the plate arranged to guide and control movement of the plate from shoe receiving position upwardly and backwardly into operative relation to said means.

109. A welt butting machine having, in combination, a welt butter, actuating mechanism therefor including a clutch, and means arranged to operate during the presentation of the shoe for automatically tripping and resetting the clutch.

110. A welt butting machine having, in combination, a welt butter, actuating mechanism therefor including a clutch, a welt rest, and means arranged to be operated during the movement of the shoe from position of presentation to the welt rest into operative relation to the welt butter for automatically tripping the clutch to start the butter.

111. A machine of the class described having, in combination, means to butt a welt, means to press inwardly over the shoe bottom the stock adjacent to the end of the welt, means to tack the stock to secure it while it is so pressed, said butting and tacking means being arranged for operation on a shoe occupying different positions in the machine, and means which sustains the shoe while the welt is being butted and is adapted for operation thereafter to effect compression of the stock substantially perpendicular to the plane of the shoe bottom before the insertion of the tack.

112. A machine of the class described having, in combination, means to butt simultaneously the two ends of the welt of a welted shoe, means to tighten the upper over the last bottom adjacent to a butt end of the welt, means to secure the upper in tightened relation to the last on the two sides of the shoe successively, and means to compress the shoe stock against the last bottom adjacent said end of the welt in time relation to each of the two successive securing operations on the same shoe.

113. A machine of the class described having, in combination, means for removing surplus material from a shoe bottom, and a pivotally mounted guard arranged to receive the shoe in a position below said means and movable upwardly to guide and direct movement of the shoe into operative relation to said means.

114. A machine of the class described having, in combination, means for operating on a shoe bottom, a pivotally mounted shield for the shoe bottom arranged to receive the shoe in a position remote from said means and to be moved upwardly and backwardly in a predetermined path with the shoe into operative relation to said means.

115. A machine of the class described having, in combination, a cutter, and means for positioning the bottom of a shoe in effective relation to said cutter constructed and arranged to control approach of the shoe to the cutter longitudinally and vertically while maintaining the same angular relation of the bottom of the shoe to the cutter and arranged to receive the shoe in a position remote from the cutter and to move simultaneously upward and backward to bring the shoe into the field of operation of the cutter.

116. A machine of the class described having, in combination, welt butting mechanism, shoe positioning means movable to present the shoe in position for the welt to be butted by said mechanism, and operating means for said mechanism arranged to be actuated without further attention upon the part of the operative when the shoe has been presented in welt butting position.

117. A machine of the class described having, in combination, power operated welt butting mechanism, a clutch for controlling the actuation of said mechanism, shoe positioning means movable to present the shoe in position for the welt to be butted by said mechanism, and clutch actuating means movable in time relation to the movement of the shoe positioning means to cause the welt butting mechanism to be operated after the shoe has been presented in welt butting position.

In testimony whereof I have signed my name to the specification in the presence of two subscribing witnesses.

LOUIS G. FREEMAN.

Witnesses:

GERRITT J. FREDRIKS, Jr.,
M. M. DERMODY.